(12) United States Patent
Weitbruch et al.

(10) Patent No.: US 6,961,379 B2
(45) Date of Patent: Nov. 1, 2005

(54) METHOD FOR PROCESSING VIDEO PICTURES AND APPARATUS FOR PROCESSING VIDEO PICTURES

(75) Inventors: Sebastien Weitbruch, Mönchweiler (DE); Carlos Correa, Villingen-Schwenningen (DE); Rainer Zwing, Villingen-Schwenningen (DE)

(73) Assignee: Thomson Licensing S.A., Boulogne-Billancourt (FR)

( * ) Notice: Subject to any disclaimer, the term of this patent is extended or adjusted under 35 U.S.C. 154(b) by 763 days.

(21) Appl. No.: 09/903,955

(22) Filed: Jul. 12, 2001

(65) Prior Publication Data

US 2002/0031180 A1 Mar. 14, 2002

(30) Foreign Application Priority Data

Jul. 12, 2000 (EP) .......................................... 00250230

(51) Int. Cl.$^7$ ............................................... H04N 7/12
(52) U.S. Cl. ........................... 375/240.16; 375/240.25; 375/240.26; 375/240.28
(58) Field of Search ....................... 375/240.25, 240.26, 375/240.28, 240.16

(56) References Cited

U.S. PATENT DOCUMENTS

| | | | | |
|---|---|---|---|---|
| 5,760,846 A | * | 6/1998 | Lee ........................... | 348/699 |
| 6,100,863 A | * | 8/2000 | Zhu ............................ | 345/89 |
| 6,310,918 B1 | * | 10/2001 | Saha et al. ............. | 375/240.16 |
| 6,373,477 B1 | * | 4/2002 | Van Dijk .................... | 345/204 |
| 6,717,558 B1 | * | 4/2004 | Weitbruch et al. ............ | 345/63 |

FOREIGN PATENT DOCUMENTS

| | | |
|---|---|---|
| EP | 0822536 | 2/1998 |
| EP | 0978817 | 2/2000 |

OTHER PUBLICATIONS

Karla S. et al. "Bidirectional Motion Estimation via Vector Propagation" IEEE Transactions on Circuits and Systems for Video Technology, US IEEE Inc. New York, vol. 8, No. 8, pp. 976–987.
Copy of European Search Report.

* cited by examiner

*Primary Examiner*—Chris Kelley
*Assistant Examiner*—Patrick Cathey, II
(74) *Attorney, Agent, or Firm*—Joseph S. Tripoli; Harvey D. Fried; Sammy S. Henig (57) ABSTRACT

With the new plasma display panel technology new kinds of artifacts can occur in video pictures. These artifacts are commonly described as dynamic false contour effect, since they correspond to disturbances of grey levels and colors in the form of an apparition of colored edges in the picture when the observation point on the PDP screen moves. According to the invention such an artifact is compensated by analyzing the motion in the pictures assigning to each block of a picture a corresponding motion vector and performing a re-coding step in which a sub-field code word entry of a current pixel are calculated. For this purpose the motion vector is defined to point from a pixel in a previous picture to a pixel in the current picture. The sub-field code word entries for a current pixel (P8) are determined by dragging sub-field entries of the pixels lying on the motion vector trajectory. In this way for each pixel there is an exact calculation of the sub-field code word of a pixel also for complex moving trajectories like zoom and rotation.

8 Claims, 8 Drawing Sheets

METHOD FOR PROCESSING VIDEO PICTURES AND APPARATUS FOR PROCESSING VIDEO PICTURES

The invention relates to a method and an apparatus for processing video pictures, especially for a false contour effect compensation.

More specifically the invention is closely related to a kind of video processing for improving the picture quality of pictures which are displayed on matrix displays like plasma display panels (PDP), LCOS or display devices with digital micro mirror arrays (DMD).

BACKGROUND OF THE INVENTION

Although plasma display panels are known for many years, plasma displays are encountering a growing interest from TV manufacturers. Indeed, this technology now makes it possible to achieve flat color panels of large size and with limited depths without any viewing angle constraints. The size of the displays may be much larger than the classical CRT picture tubes would have ever been allowed.

Referring to the latest generation of European TV sets, a lot of work has been made to improve its picture quality. Consequently, there is a strong demand, that a TV set built in a new technology like the plasma display technology has to provide a picture so good or better than the old standard TV technology. On one hand, the plasma display technology gives the possibility of nearly unlimited screen size, also of attractive thickness, but on the other hand, it generates new kinds of artefacts which could damage the picture quality. Most of these artefacts are different from the known artefacts occurring on classical CRT color picture tubes. Its mainly this different appearance of the artefacts which makes them more visible to the viewer since the viewer is used to see the well-known old TV artefacts.

The invention deals with a specific new artefact, which is called "dynamic false contour effect" since it corresponds to disturbances of grey levels and colors in the form of an apparition of colored edges in the picture when an observation point on the matrix screen moves. This kind of artefact is enhanced when the image has a smooth gradation like when the skin of a person is being displayed (e.g. displaying of a face or an arm, etc.). In addition, the same problem occurs on static images when observers are shaking their heads and that leads to the conclusion that such a failure depends on the human visual perception and happens on the retina of the eye.

Two approaches have been discussed to compensate for the false contour effect. As the false contour effect is directly related to the sub-field organization of the used plasma technology one approach is to make an optimization of the sub-field organization of the plasma display panels. The sub-field organization will be explained in greater detail below but for the moment it should be noted that it is a kind of decomposition of the 8-bit grey level in 8 or more lighting sub-periods. An optimization of such a picture encoding will have, indeed, a positive effect on the false contour effect. Nevertheless, such a solution can only slightly reduce the false contour effect amplitude but in any cases the effect will still occur and will be perceivable. Furthermore, sub-field organization is not a simple matter of design choice. The more sub-fields are allowed the less luminance the panel will be able to produce. So, optimization of the sub-field organization is only possible in a narrow range and will not eliminate this effect alone.

The second approach for the solution of above-mentioned problem is known under the expression "pulse equalization technique". This technique is a more complex one. It uses equalizing pulses which are added or separated from the TV signal when disturbances of grey scales are foreseen. In addition, since the fact that the false contour effect is motion relevant, we need different pulses for each possible speed. That leads to the need of a big memory storing a number of big look-up tables (LUT) for each speed and there is a need of a motion estimator. Furthermore, since the false contour effect depends on the sub-field organization, the pulses have to be re-calculated for each new sub-field organization. However, the big disadvantage of this technique results from the fact that the equalizing pulses add failures to the picture to compensate for a failure appearing on the eye retina. Additionally, when the motion is increasing in the picture, there is a need to add more pulses to the picture and that leads to conflicts with the picture contents in case of very fast motion.

SUMMARY OF THE INVENTION

Therefore, it is an object of the present invention to disclose a method and an apparatus which achieve an efficient false contour effect compensation without affecting the picture content and which is easy to implement. This object is obtained by the measures claimed in claims 1 and 7.

According to the claimed solution in claim 1 the compensation of the false contour effect is made by using motion vectors for the pixels in the video picture calculated in a motion estimator in a manner that the resulting motion vector determines for a current pixel from which location in a previous video picture the current pixel comes from. So, for each pixel or block of pixels in the current frame, a unique motion vector defines the source of this vector in the previous frame. In addition, the vector is used in a different way. In other words, for each pixel from the current frame, the vector describes where the pixel is coming from. It is assured in the motion estimator itself, that only one vector is assigned to a pixel, even if there are several possibilities for one pixel. E.g. in the case that several pixels of a previous video picture move to the same location in the current picture, the possible vectors can be combined to one final motion vector.

A motion vector is used for re-coding the sub-field code word of a current pixel for false contour effect compensation. This is corresponding to the general idea of another invention of the applicant (see EP-A-0 980 059) according to which the movements in the picture (displacement of the eye focus area) are detected and the right sub-field lighting periods are spread over this displacement in order to ensure that the eye will only perceive the correct information through its movement. Using the motion vector which defines the source of the current pixel has the advantage that a false contour effect compensation can be made reliably even in case of complicated motion in the pictures, like zoom operations or rotations.

E.g., the appearance of "black holes" in a picture is specifically avoided, if a block spreads out in several different directions since each current block will have only one vector defining one single source (no conflict anymore). Such conflicts occur, if the motion vector is defined in the conventional manner where it points to the place in a following picture to which a current pixel moves.

The approach of false contour effect compensation based on a motion estimation has the great advantage that it will not add false information in the picture, and in addition, this solution is independent from the picture content. Further advantages are that the inventive method allows a complete correction of the false contour effect when the motion vector is well-known. Therefore, the motion estimator provides best one motion vector for one pixel. For this reason there is no problem if the information of one pixel is spreading in several different directions. Also in the case that different pixels from a previous frame move to the current pixel location there is no conflict, since the motion estimator determines only a single motion vector representing the source of this current pixel.

Also the method does not depend from the used addressing technique for the plasma display panel. With regard to the disclosed specific embodiment, when the addressing or the sub-field organization changes there is only the need to recalculate the different time points of the sub-fields but the algorithm remains unchanged.

Another important advantage is that the picture noise has no impact on the correction quality. The method according to the invention is easy to implement. There is no need of a big memory since it does not need any kind of LUTs like the pulse equalization technique.

Advantageously, additional embodiments of the inventive method and apparatus are disclosed in the respective dependent claims.

BRIEF DESCRIPTION OF THE DRAWINGS

Examplary embodiments of the invention are illustrated in the drawings and are explained in more detail in the following description.

DESCRIPTION OF THE PREFFERED EMBODIMENTS

Figure 1:
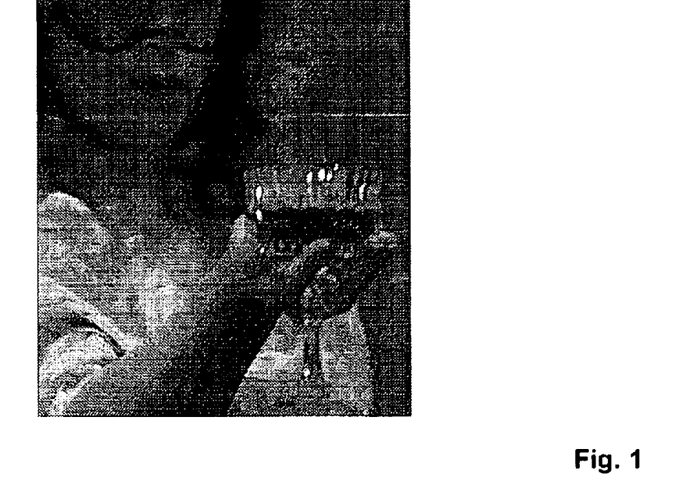
FIG. 1 shows a video picture in which the false contour effect is simulated.

The artefact due to the false contour effect is shown in FIG. 1. On the arm of the displayed woman are shown two dark lines which, for example, are caused by this false contour effect. Also in the face of the woman such dark lines occur at the right side.

A plasma display panel utilizes a matrix array of discharge cells which can only be switched ON or OFF. For colour displays, there are three cells required for one pixel according to the three colour components R,G,B. Also unlike a CRT or LCD in which grey levels are expressed by analog control of the light emission, in a PDP the grey levelof each colour component is controlled by modulating the number of light pulses per video frame. This time-modulation will be integrated by the eye over a period corresponding to the eye time response.

In the field of digital video processing, all 8-bit (256) luminance levels are represented by a combination of the 8 following bits:

$2^0=1, 2^1=2, 2^2=4, 2^3=8, 2^4=16, 2^5=32, 2^6=64, 2^7=128$.

Figure 2:
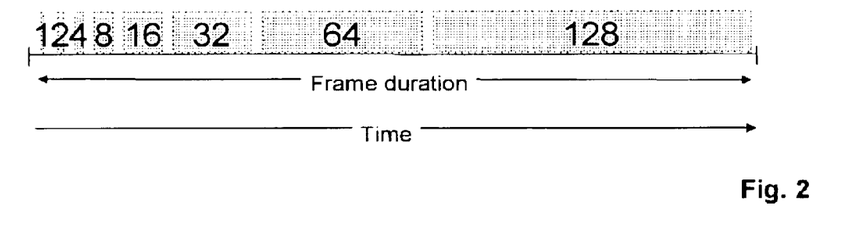
FIG. 2 shows an illustration for explaining the sub-field organization of a PDP.

To enable such a coding with the PDP technology, the frame period could be divided in 8 lighting periods (called sub-fields), each one corresponding to a bit. The number of light pulses for the bit "2" is the double as for the bit "1" . . . With these 8 sub-periods, it is possible through combination, to build the 256 gray levels. A possible sub-field organization with 8 sub-fields is shown in FIG. 2.

For clarification it is added, that a sub-field period is a sub-period of a frame period and consists of three phases, namely addressing period, sustaining period and erasing period. During the addressing period the cells which needs to be activated according to a sub-field code word are written (precharged) with a defined voltage. It is a prerequisite that the charge stored in a cell remains stable for a certain time period. After all cells have been written, the cells are subjected to the sustaining phase, where additional charge is loaded into the cells in small pulses. This leads to an ignition of those cells, previously being written in the addressing phase. UV-radition is produced during ignition and in consequence, the phosphorous material of the cells is excited and light is output. It follows an erasing phase for all the cells to transform the cells back to a neutral state.

Without motion, the eye of the observers will integrate over about a frame period these small lighting pulses and catch the impression of the right gray level.

When an observation point (eye focus area) on the PDP screen moves, the eye will follow this movement. Consequently, it will no more integrate the light from the same cell over a frame period (static integration) but it will integrate information coming from different cells located on the movement trajectory. Thus it will mix all the light pulses during this movement which leads to a faulty signal information. This effect will now be explained in more detail below.

Figure 3:
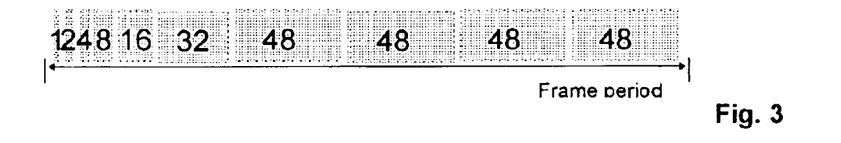
FIG. 3 shows a second example of a sub-field organization of a PDP.
Figure 4:
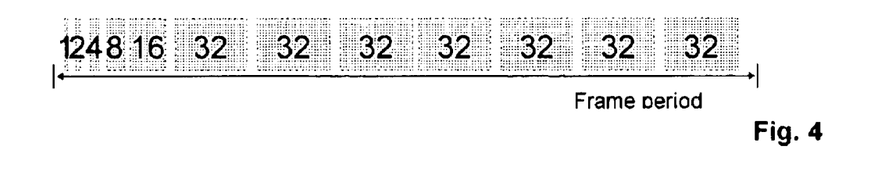
FIG. 4 shows a third example of a sub-field organization of a PDP.

In the field of plasma video encoding, the use of more than 8 sub-fields to represent the 256 original video levels is very common. This aims at reducing the level of the MSBs which are directly linked to the maximum level of false contour generated. A first example of such a sub-field organisation based on 10 sub-fields is shown in FIG. 3. A second exsample of a sub-field organisation based on 12 sub-fields is shown in FIG. 4. Of course, the sub-field organisations shown in FIGS. 3 and 4 are only examples and the sub-field organisation can be subject of modification for other embodiments.

The light emission pattern according to the sub-field organization introduces new categories of image quality degradation corresponding to disturbances of grey levels and colors. As already explained, these disturbances are defined as so-called dynamic false contour effects since the fact that they correspond to the appearance of colored edges in the picture when an observation point on the PDP screen moves. The observer has the impression of a strong contour appearing on a homogeneous area like displayed skin. The degradation is enhanced when the image has a smooth gradation and also when the light emission period exceeds several milliseconds. So, in dark scenes the effect is not so disturbing as in scenes with average grey level (e.g. luminance values from 32 to 223).

In addition, the same problem occurs in static images when observers are shaking the heads which leads to the conclusion that such a failure depends on the human visual perception.

To better understand the basic mechanism of visual perception of moving images, a simple case will be considered. Let us assume a transition between the luminance levels 128 and 127 moving at a speed of 5 pixel per video frame and the eye is following this movement.

Figure 5:
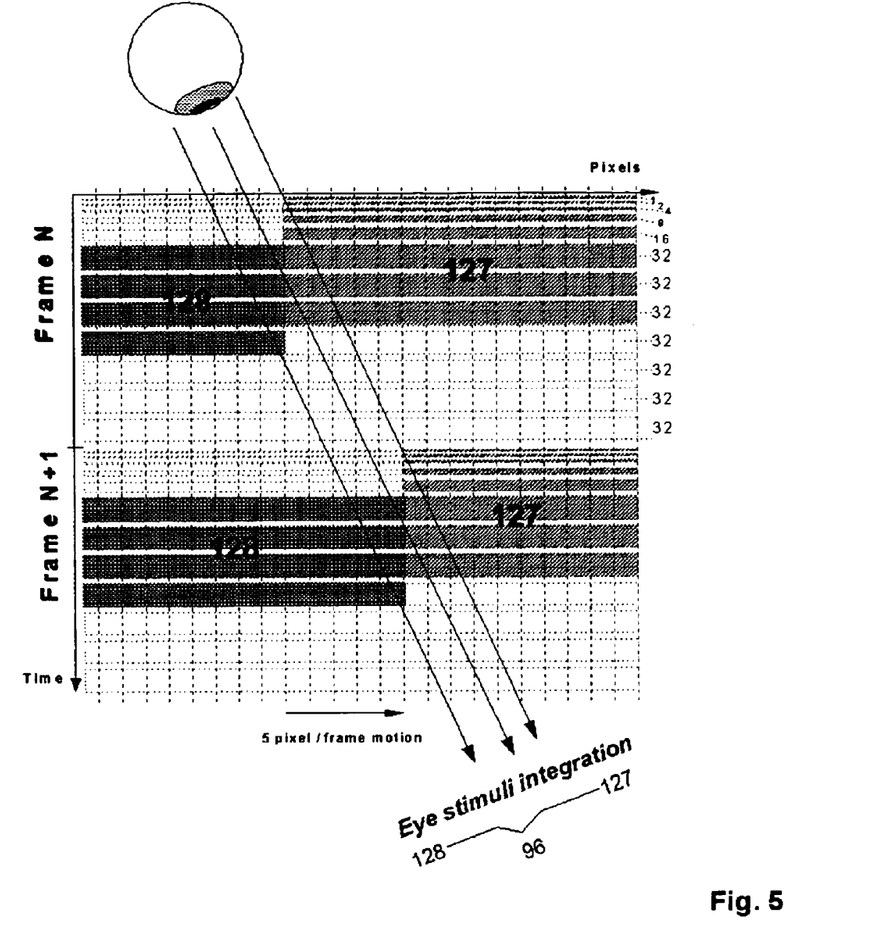
FIG. 5 shows an illustration for explaining the false contour effect.
Figure 6:
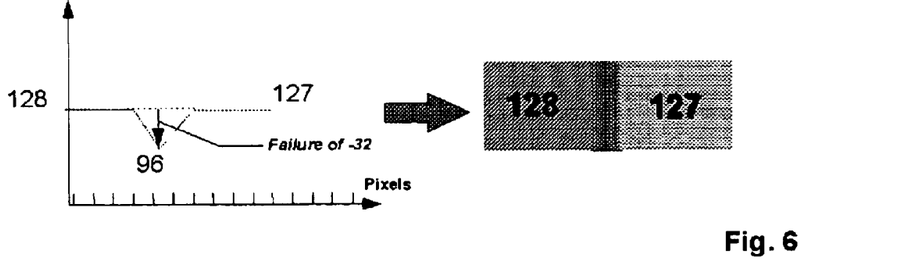
FIG. 6 illustrates the appearance of a dark edge when a video picture sequence like the one shown in FIG. 3 is displayed.

FIG. 5 shows a darker shaded area corresponding to the luminance level 128 and a lighter shaded area corresponding to the luminance level 127. The sub-field organization, shown in FIG. 4 is used for building the luminance levels 128 and 127 as it is depicted on the right side of FIG. 5. The three parallel lines in FIG. 5 indicate the direction in which the eye is following the movement. The two outer lines show the area borders where a faulty signal will be perceived. Between them the eye will perceive a lack of luminance which leads to the appearance of a dark edge in the corresponding area which is illustrated in FIG. 6.

The effect that a lack of luminance will be perceived in the shown area is due to the fact that the eye will no more integrate all lighting periods of one pixel when the point from which the eye receives light is in movement. Only part of the light pulses will probably be integrated when the point moves. Therefore, there is a lack of corresponding luminance and the dark edge will occur. On the left side of FIG. 6, there is shown a curve which illustrates the behavior of the eye cells during observing the moving picture depicted in FIG. 5. The eye cells having a good distance from the horizontal transition will integrate enough light from the corresponding pixels. Only the eye cells which are near the transition will not be able to integrate a lot of light from the same pixels. In case of a gray scale this effect corresponds to the apparition of artificial white or black edges. In the case of colored pictures, since this effect will occur independently on the different color components, it will lead to the apparition of colored edges in homogeneous areas like skin.

Next, the occurrence of blurred edges corresponding to a reduction of sharpness on moving object borders is explained: Let us assume a pure black to white transition between the level 0 and 255 moving at 5 pixel per frame, the eye following this movement as illustrated in FIG. 7.

Figure 7:
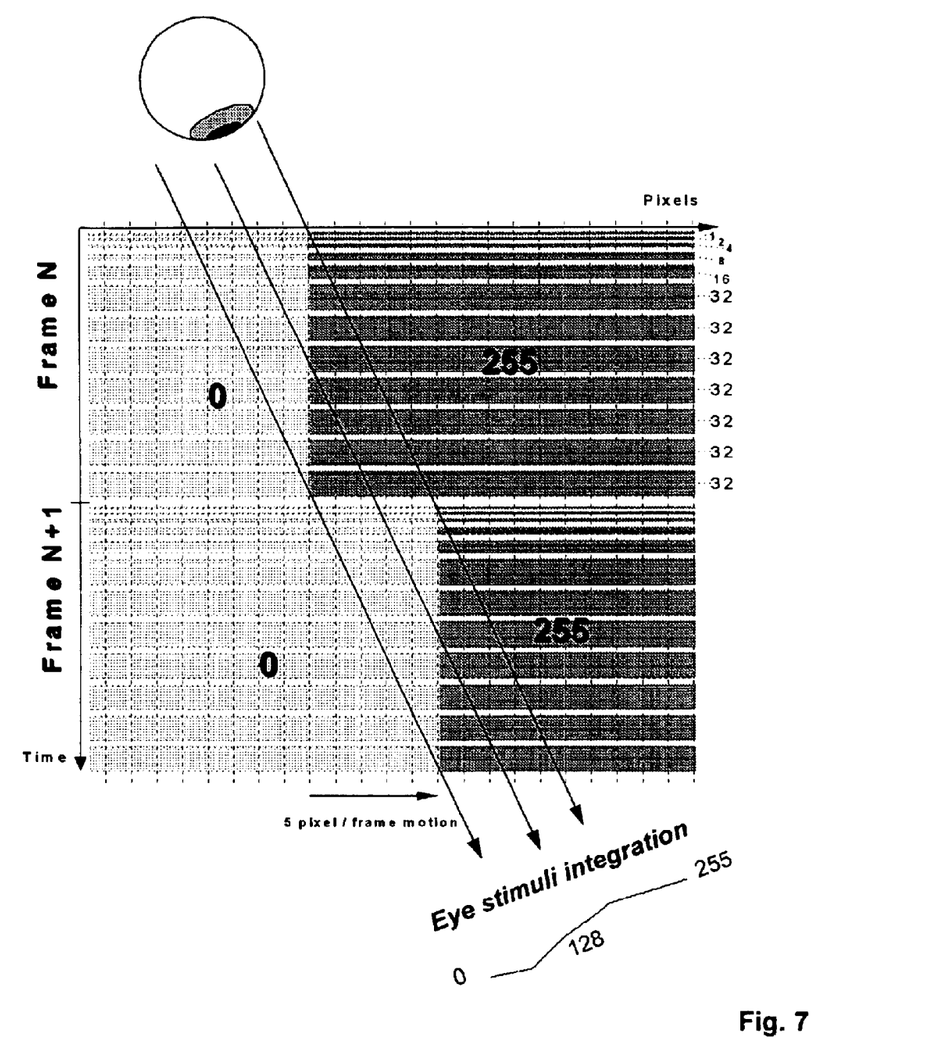
FIG. 7 shows a second example of a video sequence which is critical and leads to the appearance of false contour effect.
Figure 8:
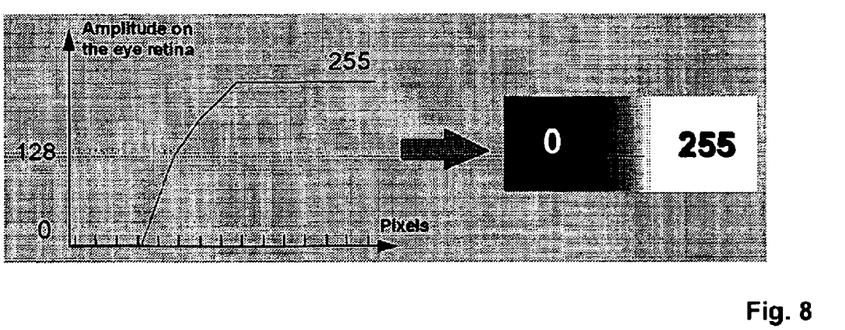
FIG. 8 illustrates the appearance of a blurred edge when a video picture sequence like the one shown in FIG. 5 is displayed.

On the FIG. 7, we can follow the behavior of the eye integration during a movement. The two extreme diagonal eye-integration-lines show the limits of the faulty perceived signal. Between them, the eye will perceive a growing luminance which leads to the appearing of a shaded edge like in FIG. 8. Consequently, the pure black to white transition will be lost during a movement and that leads to a reduction of the global picture sharpness impression.

Figure 9:
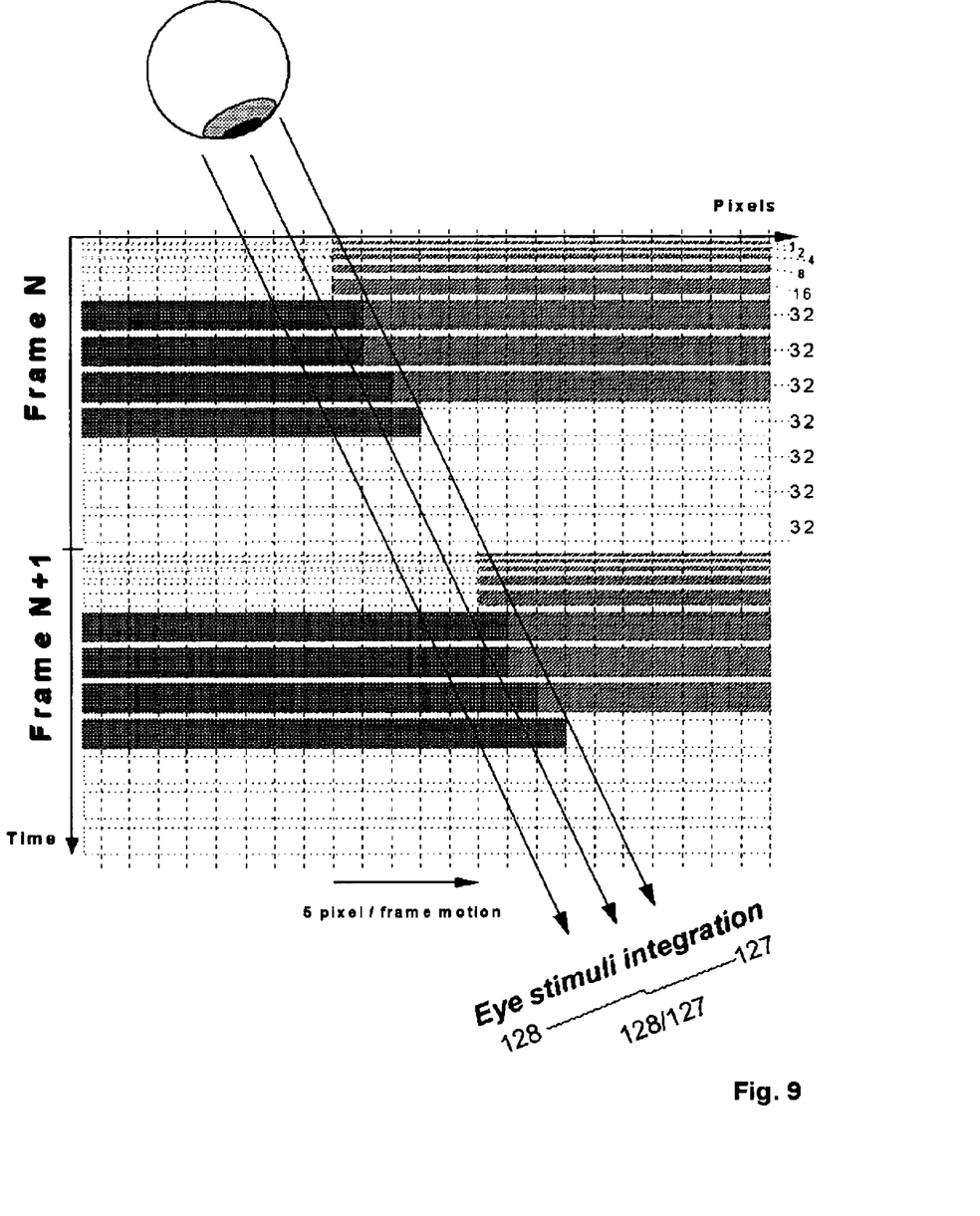
FIG. 9 shows the illustration of FIG. 3 but with the implementation of the false contour effect compensation method described in EP-A-0 980 059.

Now, the main idea of an invention disclosed in another European Patent Application of the applicant, see EP-A-0 980 059, is to anticipate the movement in the picture in order to position the different light pulses of a cell of the moving area on the eye integration trajectory. According to this the light pulses of some sub-fields of a pixel in a picture are shifted to another pixel or pixels in the current video frame, depending on the eye movement, to make sure that the eye will receive the right information at the right time during its movement. This principle is illustrated in FIG. 9. There it is shown that the light pulses of the sixth and seventh sub-field of all pixels shown are shifted by one pixel to the right, the light pulses of the eighth sub-field are shifted by two pixels to the right and the light pulses of the ninth sub-field are shifted by three pixels to the right. All pixels have the same motion vector, so they are all subject of shifting. The effect of this is, that the eye following the movement in the picture will integrate all the lighting periods of the sixth to ninth sub-field, thus leading to a corresponding luminance value of 128 as shown in the eye-stimuli curve at the bottom of FIG. 9. The result is that no dark area will be perceived.

Please note that the illustration is simplified in that respect that the stimuli integration curve is smoothed at the border areas of the transition. Another point to which attention is drawn is the fact, that the motion vector is defined in the conventional manner, i.e. it indicates where a pixel of a current frame is going in the following video picture.

Figure 10:
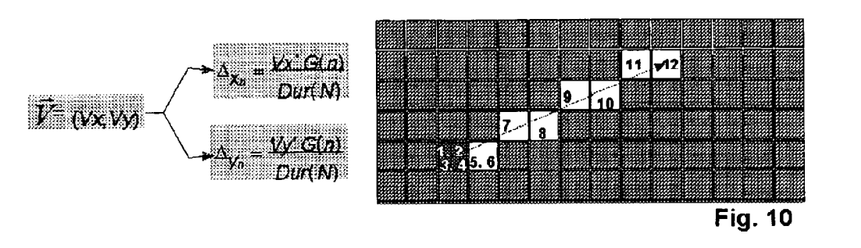
FIG. 10 shows the concept of sub-field code word entry shifting according to EP-A-0 980 059.

In FIG. 10, it is shown the concept of sub-field shifting as disclosed in EP-A-0 980 059. From this picture it is clear that the motion vector points away from the current sub-field, and that the lighting periods of a current pixel are shifted away from this pixel to other pixels along the motion vector trajectory. The shift coordinates are calculated as shown in FIG. 10. All terms will be explained later in the description.

As a result, this technique aims to modify the coding of the pixels depending on the motion amplitude and direction. This technique shows very good results since it makes it possible to remove completely the false contour effect when the motion is well detected. In the case of a false motion estimation, since no pulses are added to the picture but picture contents are shifted, the picture quality is not disturbed a lot.

Figure 11:
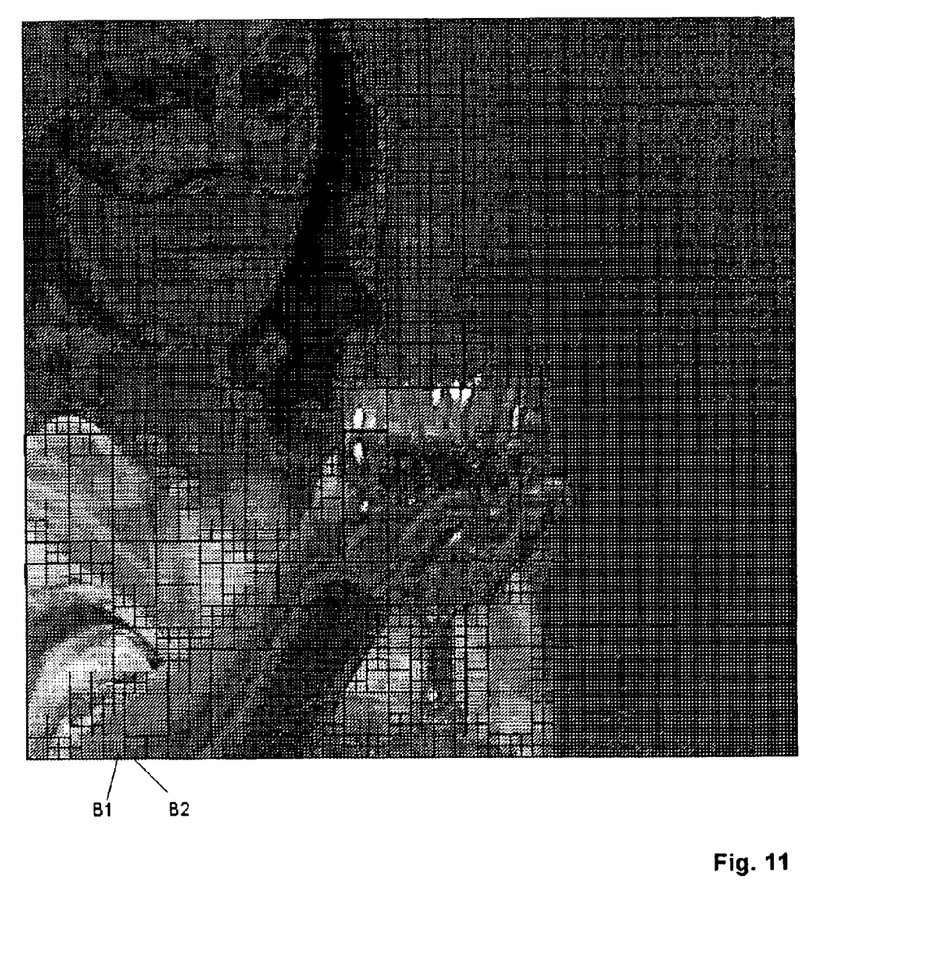
FIG. 11 shows a segmentation of a picture in blocks for calculating a motion vector for the blocks.

In the following, the algorithm is described in greater detail. Conventional motion estimators determine motion vectors for blocks of pixels. FIG. 11 shows a typical segmentation of a picture in blocks B1, B2. The blocks can have different size. In homogenous areas the blocks will have bigger size and in heterogeneous areas the blocks will have small size. Of course, a block can also have a size of only one pixel (1*1 block) at minimum. To each block, a single motion vector will be assigned. Other types of motion-dependent picture segmentations could be used, since the goal is only to decompose the picture in basic elements having a well-defined motion vector. So all motion estimators can be used for the invention, which are able to subdivide a picture in blocks and to calculate for each block a corresponding motion vector. As motion estimators are well-known from, for example 100 Hz up-conversion technique and also from MPEG coding etc., they are well-known in the art and there is no need to describe them in greater detail here. As an example where a motion estimator is described which could be used in this invention, it is referred to WO-A-89/08891. Best to be used are motion estimators which give precisely the direction of the movement and the amplitude of this movement for each block. Since most of the plasma display panels are working on red, green, blue (RGB) component data, benefit could be achieved when for each RGB component a separate motion estimation is being carried out and these three components are combined so that the efficiency of the motion estimation will be improved. In this regard, it is referred to the European Patent Application 99250346.6 of the applicant where further details to dedicated motion estimators for plasma displays are presented. The difference to the conventional motion estimators is, that the motion vector is defined differently, namely that it points from the location in the previous frame to the point to which this pixel moves in the current video picture. Thus, it does not point away from the current pixel but points to the current pixel. Here, only a slight modification of the conventional motion estimators is necessary.

The picture block recoding step will follow the motion estimation step. In the embodiment of the invention described here, there are some simplifying assumptions made:

1.) The addressing and erasing time periods within the sub-fields is not taken into account.
2.) The sub-fields organization scheme shown in FIG. 4 is used.

Figure 12:
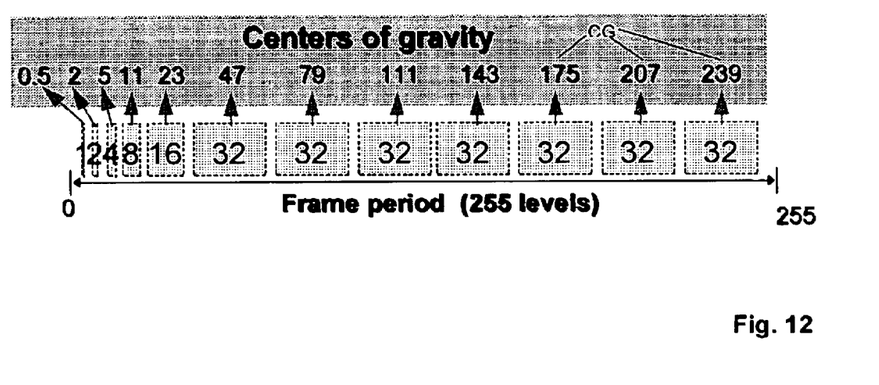
FIG. 12 illustrates the centers of gravity for the sub-fields of a preferred embodiment of a sub-field organisation.

In a first step a computation of the drag coordinates for the sub-field lighing periods is performed. To each sub-field corresponds a center of gravity (at the position of the middle of the sub-field duration) representing its location in the frame period. Note, that the addressing and erasing time is not being taken into account here. FIG. 12 illustrates the center of gravity positions within a frame period, wherein a frame lasts from 0 to 255 relative time units. As plasma displays are addressed in progressive scan mode (interlace video norms require a previous conversion, here) a video frame lasts 20 ms for 50 Hz plasma panel technology. For interlace—progressive scan conversion many solutions are known in the art which can be used here.

The computation of the center of gravity for each sub-field can easily be calculated according to the simple formula $$G(n)=S(n)+Dur(n)/2$$

where G(n) represents the center of gravity location of a current sub-field, n represents the current sub-field number, S(n) represents the start point of the current sub-field and Dur(n) represents the duration of the sub-field.

In order to implement a dynamic false contour compensation, for each pixel from the frame N, we will dispose a vector $V^N$ (=$V^N_x$; $V^N_y$) describing the movement of a block from the frame N−1 to the frame N, which is provided by a motion estimator for each pixel of the display. The pixel can be part of a block which is changing its position on the display from a frame N−1 to a frame N.

Figure 13:
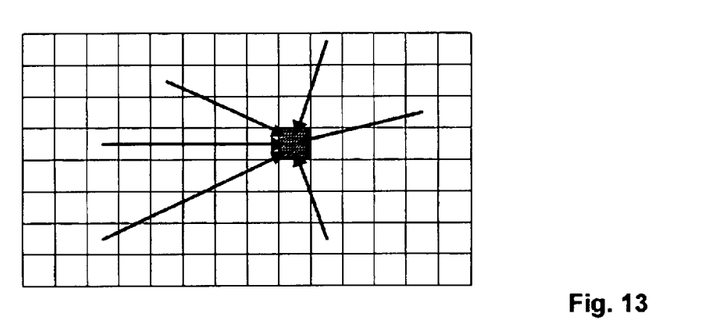
FIG. 13 shows a first example of complex movement in a video picture.

As mentioned before, in standard motion estimators this vector describes the movement of the pixel between the frame N and the frame N+1. In other words, this vector defines where the current pixel is going. This leads in a case of a complex movement as shown in FIG. 13, where several pixels are moving to one common pixel to problems, because it is not clear which sub-field should be shifted to the common pixel.

Figure 14:
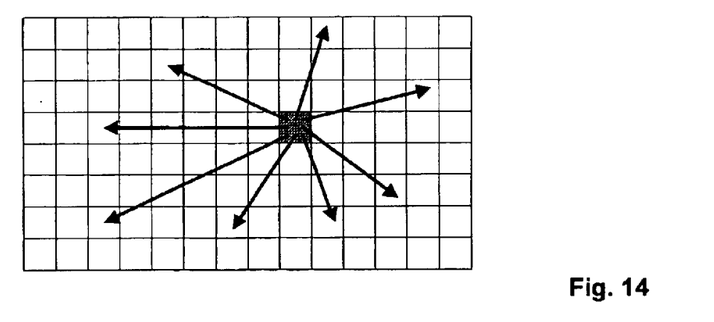
FIG. 14 shows a second example of complex movement in a video picture.

Also the case shown in FIG. 14, in which all the sub-fields of a single pixel are shifted away in different directions to different pixels, there is according to the known use of the motion vector a lack of energy at the single pixel. Therefore, this situation will lead to a "black hole" in the picture.

According to the invention for each pixel the motion estimator will define only one motion vector which shows from where the sub-fields of the pixel are coming in the previous frame N−1.

Figure 15:
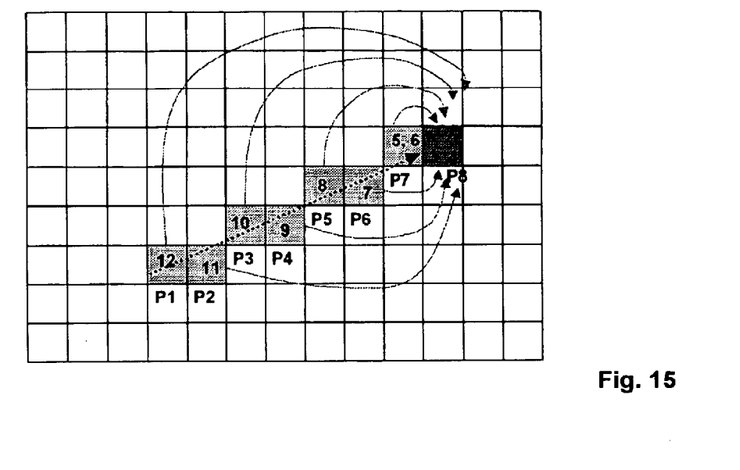
FIG. 15 shows the principle of sub-field dragging.

FIG. 15 shows the principle of this "sub-field dragging" wherein the sub-field drag coordinates for each current pixel are computed depending on its motion vector V ($V_x$; $V_y$). The original sub-field code word is therefore changed. For example in the example shown in FIG. 15 the first four bits of the sub-field code word are taken from the original sub-field code word, i.e. they remain unchanged. The fifth and sixth bit of the sub-field code word are taken from the original sub-field code word of the pixel directly to the left of the current pixel. And the seventh to twelveth bit of the sub-field code word are taken from other pixels along the motion vector trajectory as shown in FIG. 15. For instance, the bit for sub-field 12 on the current pixel is coming from the pixel located at the vector origin. Therefore, each pixel is handled only one time and this cannot generate any conflict.

In other words, for each sub-field entry of the current pixel we will search from where this sub-field entry is coming. This needs a new definition of the motion vector field for frame N which will now describe the movement from the frame N−1 to the frame N. In this new concept a motion vector describes from where a pixel is coming. In other words, for each pixel of frame N, an unique vector pointing from frame N−1 to frame N will be provided by the motion estimator. Each vector will point on the current pixel and will also define the movement of the source of this pixel from the previous frame N−1. Obviously, since there is only one vector per pixel there will be no conflict anymore and also no lack of energy since the motion vector for the pixel in the centre of FIG. 14 will probably be zero and the sub-field code word will remain unchanged for this pixel.

The algorithm according to the invention can be defined as follows:

For each pixel P located at (x,y) in the current frame N
{
    For (n=0; n<nSF; n++)
    {
        P(x,y)[n]=P(x+$\Delta x_n$; y+$\Delta y_n$)[n]
    }

In this formula P(x,y)[n] represents the entry for sub-field n for the pixel located at position (x,y) in the current frame N. $\Delta x_n$ und $\Delta y_n$ represent the relative position where the entry for sub-field n is coming from. This means it is coming from the original sub-field code word of the pixel in the current video frame at the position (x+$\Delta x_n$; y+$\Delta y_n$).

In the case of our specific algorithm, the drag coordinates are calculated according to the following formulas:

$$\Delta x_n = -\frac{Vx \cdot G(n)}{Dur(N)}$$

$$V = (Vx, Vy)$$

$$\Delta y_n = -\frac{Vy \cdot G(n)}{Dur(N)}$$

Having given a motion vector V=(Vx; Vy), the positions where the sub-field entries need to be taken from are calculated according to the formula $$\Delta x_n = -\frac{Vx \cdot G(n)}{Dur(N)} \text{ and } \Delta y_n = -\frac{Vy \cdot G(n)}{Dur(N)}$$

in which Dur(N) represents the complete duration of the frame N. In the example where V=(7; 0) the following results with a negative sign are found:

| Sub-field | 1 | 2 | 3 | 4 | 5 | 6 | 7 | 8 | 9 | 10 | 11 | 12 |
|---|---|---|---|---|---|---|---|---|---|---|---|---|
| $\Delta_x$ | 0 | 0 | 0 | 0 | −1 | −1 | −2 | −3 | −4 | −5 | −6 | −6 |
| $\Delta_y$ | 0 | 0 | 0 | 0 | 0 | 0 | 0 | 0 | 0 | 0 | 0 | 0 |

Please note, that only the integer parts of the results after rounding are relevant, because the minimum relative position is one pixel.

It goes without saying that the same principle will be applied for other speed amplitudes and other directions. In case of a more complex motion direction, sub-field entries will be moved in both directions horizontal and vertical.

Figure 16:
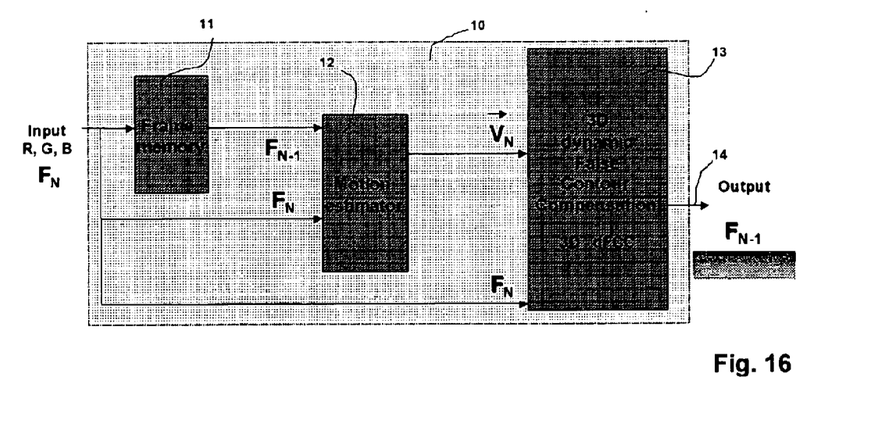
FIG. 16 shows a block diagram of the apparatus according to the invention.

FIG. 16 shows that the new inventive method is not a method o f shifting the sub-field lighting periods away from a current pixel to another pixel but dragging the sub-field lighting periods to the current pixel P8.

FIG. 15 shows the sub-fields 12, 11, 10, 9, 8, 7, 5, 6 which are all dragged to the pixel P8 so that the pixel P8 shows all the sub-fields 6 to 12 on the motion trajectory and the sub-fields 1 to 4 which stay at the pixel P8 and are not moved. For all the pixels of the display the previously calculated drag coordinates are used to determine which sub-fields are dragged to the pixel according to the algorithm shown above. This is a part of the compensation method which calculates from where do the sub-fields come to the pixel. The sub-fields 12, 11, 10, 9, 8, 7, 5, 6 have no influence on the pixels where they are positioned in FIG. 12. FIG. 12 is only an explanation of the principle of sub-field dragging which shows where the different sub-fields for the pixel P8 come from. For instance, after this processing step, the new $12^{th}$ sub-field from P8 will be the old $12^{th}$ sub-field from P1!

An apparatus according to the invention is shown in FIG. 16. The apparatus may be integrated together with the PDP matrix display. It could also be in a separate box which is to be connected with the plasma display panel. Reference no. 10 denotes the whole apparatus. Reference no. 11 denotes the frame memory to which the original video data is input (e.g. RGB, YUV, sub-field data . . . ). The frame memory 11 is connected to the motion estimator 12. The motion estimator 12 receives the original video data of the frame N−1 and also as another input the original video data of the next frame N. So it has access to two succeeding frames in order to detect the motion in the video pictures. Other apparatusses using different kind of picture information can be also used to output motion information. The major issue is only to provide, for each pixel of the picture, the source of this pixel in the previous frame. The resulting motion vectors are output to the sub-field-dragging-computing unit 13. This unit could dispose of a standard encoding block which will convert video data to sub-field data if it is needed. In this unit, sub-field code words are used. Then, based on the motion information coming from the unit 12 the pixels are re-coded, wherein sub-fields (SF) of pixels are positioned in a direction determined by the motion vector of the block as explained above, and corresponding new re-coded sub-field data is output for the frame N via output 14.

In the FIG. 16 $F_N$ represents the original video data of the current frame N and $F_{N-1}$ represents original video data of the previous frame coming from the frame memory 11. These data can have different type: RGB, YUV, luminance only, sub-field code words, . . . Then, these two frames are used by the motion estimator to compute the vectors $V_N$ related to the frame N.

It goes without saying that the blocks shown in FIG. 16 can be implemented with appropriate computer programs for the same function instead.

The invention is not restricted to the disclosed embodiments. Various modifications are possible and are considered to fall within the scope of the claims. E.g. a different sub-field organization could be used. The values in implementations covered by the patent may differ from those here shown, in particular the number and weight of the used sub-fields.

The invention can be used in particular in PDPs. Plasma displays are currently used in consumer electronics, e.g. for TV sets, and also as a monitor for computers. However, use of the invention is also appropriate for matrix displays where the light generation is made with small pulses in sub-fields, i.e. where the PWM principle is used for controlling light output.

What is claimed:

1. A method for processing video pictures, the video picture consisting of pixels, the pixels being digitally coded with at least one digital code word, wherein to each bit of a digital code word a certain duration is assigned, defining a sub-field, during which the whole pixel or a component of the pixel is activated, wherein a motion vector is calculated for a pixel, and the motion vector is used for re-coding the sub-field code word of the pixel, wherein the motion vector calculation is made in a manner that the resulting motion vector determines for a current pixel from which location in a previous video picture the current pixel comes from, wherein the re-coding step includes a step of calculating drag coordinates for one or more of the sub-field code word bits of the current pixel based on the calculated motion vector, and wherein the drag coordinates are used for selecting a pixel in the video picture and using the corresponding bit of the sub-field code word of the selected pixel to determine the corresponding bit of the new sub-field code word of the current pixel.

2. The method according to claim 1, wherein the calculation of the drag coordinates is made according to the formula:

$$\Delta x_n = -\frac{Vx \cdot G(n)}{Dur(F)} \text{ and } \Delta y_n = -\frac{Vy \cdot G(n)}{Dur(F)}$$

wherein $\Delta x_n$ represents the relative position in x-direction of a pixel from which the sub-field code word bit needs to be taken for the current pixel;

$\Delta y_n$ represents the relative position in y-direction of a pixel from which the sub-field code word bit needs to be taken for the current pixel;

$V_x$ is the x-component of the motion vector and $V_y$ is the y-component of the motion vector;

G(n) represents the center of gravity position of the sub-field in the frame period;

n is the current sub-field number and

Dur(F) is the duration of the frame.

3. The method according to claim 1, wherein to a pixel three sub-field code words are assigned, one for each colour component.

4. The method according to claim 1, wherein a sub-field is a sub-period of a video frame period consisting of an addressing period, a sustaining period and an erasing period.

5. The method according to claim 2, wherein the center of gravity (CG) of each sub-field (SF) in a frame period is calculated according to the formula:

$$G(n)=S(n)+\text{Dur}(n)/2$$

wherein G(n) represents the center of gravity location in the frame period;

n is the current sub-field number,

S(n) represents the start position of the current sub-field;

and Dur(n) represents the duration of the current sub-field.

6. An apparatus for processing video pictures, the video pictures consisting of pixels, the pixels being digitally coded with at least one digital code word, wherein to each bit of a digital code word a certain duration is assigned, hereinafter called sub-field, during which the whole pixel or a component of the pixel is activated, the apparatus comprising:

a motion estimator for calculating motion vectors for the pixels of a current video picture by comparing a current video picture with at least one previous video picture, the resulting motion vector being defined to determine for a current pixel from which location in a previous video picture the current pixel comes from, a sub-field re-coding unit in which drag coordinates for one or more of the sub-field code word bits of the current pixel based on the calculated motion vector are calculated, and a selection unit, in which the drag coordinates are used for selecting a pixel in a video picture and using the corresponding bit of the sub-field code word of the selected pixel to determine the corresponding bit of the new sub-field code word of the current pixel.

7. The apparatus according to claim 6, further comprising a matrix display.

8. The apparatus according to claim 7, wherein the matrix display comprises one of a plasma, liquid crystal on silicon, and digital micro mirror array display.

* * * * *